United States Patent
Yu et al.

(10) Patent No.: US 9,434,860 B2
(45) Date of Patent: Sep. 6, 2016

(54) ADHESIVE FILM FOR POLARIZING PLATE, ADHESIVE COMPOSITION FOR THE SAME, POLARIZING PLATE COMPRISING THE SAME AND OPTICAL DISPLAY COMPRISING THE SAME

(71) Applicant: SAMSUNG SDI CO., LTD., Yongin-si, Gyeonggi-do (KR)

(72) Inventors: Mi Yeon Yu, Uiwang-si (KR); Yoo Jin Suh, Uiwang-si (KR); Do Heon Lee, Uiwang-si (KR); Seung Hoon Lee, Uiwang-si (KR); Tae Hyun Lee, Uiwang-si (KR); Ri Ra Jung, Uiwang-si (KR); Woo Jin Jeong, Uiwang-si (KR); In Cheon Han, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/700,041

(22) Filed: Apr. 29, 2015

(65) Prior Publication Data
US 2015/0315431 A1 Nov. 5, 2015

(30) Foreign Application Priority Data
Apr. 30, 2014 (KR) .......... 10-2014-0052949

(51) Int. Cl.
| | |
|---|---|
| C08F 2/50 | (2006.01) |
| C08F 2/46 | (2006.01) |
| C08G 61/04 | (2006.01) |
| C09J 7/00 | (2006.01) |
| C09J 163/00 | (2006.01) |
| C09J 133/08 | (2006.01) |
| C08F 220/18 | (2006.01) |
| C09J 4/00 | (2006.01) |
| C09J 133/06 | (2006.01) |
| G02B 5/30 | (2006.01) |

(52) U.S. Cl.
CPC .............. C09J 7/00 (2013.01); C09J 133/08 (2013.01); C09J 163/00 (2013.01); *C08F 220/18* (2013.01); *C09J 4/00* (2013.01); *C09J 133/06* (2013.01); *C09J 2201/622* (2013.01); *C09J 2203/318* (2013.01); *C09J 2433/00* (2013.01); *C09J 2463/00* (2013.01); *G02B 5/3033* (2013.01)

(58) Field of Classification Search
CPC .......................... C09J 163/00; C09J 133/08
USPC ........... 522/26, 7, 6, 189, 184, 1, 71; 520/1
See application file for complete search history.

(56) References Cited

U.S. PATENT DOCUMENTS

| | | | |
|---|---|---|---|
| 2013/0169897 A1 | 7/2013 | Tanihara et al. | |
| 2013/0244041 A1* | 9/2013 | Cho .......................... | C09J 4/00 428/412 |
| 2014/0168580 A1* | 6/2014 | Huh ..................... | G02B 5/3033 349/96 |
| 2015/0099127 A1* | 4/2015 | Ogawa ....................... | C09J 4/00 428/414 |

FOREIGN PATENT DOCUMENTS

| | | | |
|---|---|---|---|
| KR | 10-2008-0093361 A | | 10/2008 |
| KR | 2012039581 | * | 3/2012 |
| KR | 2013027979 | * | 2/2013 |
| KR | 2013133539 | * | 9/2013 |
| WO | WO 2012/090752 A1 | | 7/2012 |

OTHER PUBLICATIONS

TW Office action dated Nov. 23, 2015 issued in Application No. TW 104113806, 4 pages.

* cited by examiner

*Primary Examiner* — Ling Choi
*Assistant Examiner* — Jessica E Whiteley
(74) *Attorney, Agent, or Firm* — Lewis Roca Rothgerber Christie LLP

(57) ABSTRACT

An adhesive composition for a polarizing plate, an adhesive film formed from the same, a polarizing plate including the same, and an optical display including the same are disclosed. The adhesive film for a polarizing plate is formed from an adhesive composition including an epoxy compound and a (meth)acrylate compound, and the adhesive film has an FT-IR peak ratio of about 0.015 or lower as defined by Equation 1.

Equation 1

$$\text{FT-IR peak ratio} = B/A \quad (1)$$

In Equation 1, A is the peak height of the peak attributable to the —(C=O)— bond at 1724 cm$^{-1}$, and B is the peak height of the peak attributable to the —CH=CH— bond at 1636 cm$^{-1}$.

13 Claims, 2 Drawing Sheets

ADHESIVE FILM FOR POLARIZING PLATE, ADHESIVE COMPOSITION FOR THE SAME, POLARIZING PLATE COMPRISING THE SAME AND OPTICAL DISPLAY COMPRISING THE SAME

CROSS-REFERENCE TO RELATED APPLICATION

This application claims priority to and the benefit of Korean Patent Application No. 10-2014-0052949, filed Apr. 30, 2014 in the Korean Intellectual Property Office, the entire content of which is incorporated herein by reference.

BACKGROUND

1. Field

Embodiments of the present invention relate to an adhesive film for polarizing plates, an adhesive composition for the same, a polarizing plate including the same, and an optical display including the same.

2. Description of the Related Art

A polarizing plate includes a polarizer and optical films formed on upper and lower surfaces of the polarizer, where the optical films are adhered to the polarizer by adhesive films. Although a water-based adhesive has been used as the adhesive composition for polarizing plates, a photo-curable adhesive has also been used recently. A photo-curable adhesive for polarizing plates has a hybrid cured structure of a cationic UV-curable epoxy compound and a radical UV-curable acrylate compound. The cationic UV-curable epoxy compound is polymerized by cations generated by light energy. The radical UV-curable acrylate compound is polymerized by radicals generated by light energy. The adhesion and durability of a polarizing plate can vary depending upon the degree of curing of the cationic UV-curable epoxy compound and the radical UV-curable acrylate compound.

SUMMARY

Embodiments of the present invention provide an adhesive film for polarizing plates, an adhesive composition for the same, a polarizing plate including the same, and/or an optical display including the same. According to embodiments of the present invention, a polarizing plate can exhibit good adhesion, durability, and adhesion after immersion in water.

In accordance with embodiments of the present invention, an adhesive film for polarizing plates is formed from an adhesive composition for polarizing plates that includes an epoxy compound and a (meth)acrylate compound, where the adhesive film has an FT-IR peak ratio of about 0.015 or less as defined by Equation 1.

Equation 1

$$\text{FT-IR peak ratio} = B/A \qquad (1)$$

In Equation 1, A is the peak height of the peak corresponding to the —(C=O)— bond at 1724 $cm^{-1}$, and B is the peak height of the peak corresponding to the —CH=CH— bond at 1636 $cm^{-1}$.

In some embodiments, the adhesive film for polarizing plates may have a glass transition temperature of about 55° C. to about 105° C.

In some embodiments, a weight ratio of the epoxy compound to the (meth)acrylate compound in the adhesive composition may be greater than about 1.

In some embodiments, the epoxy compound may include a mixture of a first epoxy compound having a glass transition temperature of about 0° C. to about 150° C. and a second epoxy compound having a glass transition temperature of about 50° C. to about 200° C.

In some embodiments, the first epoxy compound may have a different glass transition temperature than the second epoxy compound.

In some embodiments, the first epoxy compound may include an epoxy compound containing one aromatic group; and the second epoxy compound may include at least one of an epoxy compound containing at least two aromatic groups, an alicyclic epoxy compound, a hydrogenated epoxy compound, and/or an aliphatic epoxy compound.

In some embodiments, the first epoxy compound may include at least one of phenyl glycidyl ether, resorcinol diglycidyl ether, and/or butylphenyl glycidyl ether.

In some embodiments, the adhesive composition may further include a photosensitizer and a photocationic polymerization initiator.

In some embodiments, the adhesive composition may include about 0.1 parts by weight to about 10 parts by weight of the photosensitizer and about 0.1 parts by weight to about 10 parts by weight of the photocationic polymerization initiator, based on a total of 100 parts by weight of the sum of about 40 wt % to about 90 wt % of the epoxy compound and about 10 wt % to about 60 wt % of the (meth)acrylate compound in terms of solids content.

In accordance with some embodiments of the present invention, an adhesive composition for a polarizing plate includes an epoxy compound, a (meth)acrylate compound, a photosensitizer, and a photocationic polymerization initiator, where the epoxy compound includes (A1) a first epoxy compound having a glass transition temperature of about 0° C. to about 150° C.; and (A2) a second epoxy compound having a glass transition temperature of about 50° C. to about 200° C. The first epoxy compound includes an epoxy compound containing one aromatic group, and the second epoxy compound includes at least one of an epoxy compound containing at least two aromatic groups, an alicyclic epoxy compound, a hydrogenated epoxy compound, and/or an aliphatic epoxy compound.

In some embodiments, the adhesive composition may include about 0.1 parts by weight to about 10 parts by weight of the photosensitizer and about 0.1 parts by weight to about 10 parts by weight of the photocationic polymerization initiator, based on a total of 100 parts by weight of the sum of about 40 wt % to about 90 wt % of the epoxy compound and about 10 wt % to about 60 wt % of the (meth)acrylate compound in terms of solids content.

In one embodiment, the first epoxy compound may include at least one of phenyl glycidyl ether, resorcinol diglycidyl ether, and/or butylphenyl glycidyl ether.

In some embodiments, in the adhesive composition, a weight ratio of the epoxy compound to the (meth)acrylate compound may be greater than about 1.

In some embodiments, the first epoxy compound (A1) may be present in an amount of about 1 wt % to 30 wt % in the epoxy compound, and the second epoxy compound (A2) may be present in an amount of about 70 wt % to about 99 wt % in the epoxy compound.

In some embodiments, the (meth)acrylate compound may be a hydroxyl group-containing monofunctional acrylate.

In some embodiments, the (meth)acrylate compound may further include a $C_6$ to $C_{10}$ aryloxy-substituted $C_1$ to $C_{10}$ alkyl group-containing (meth)acrylate.

In accordance with some embodiments of the present invention, a polarizing plate includes the adhesive film for polarizing plates as set forth above.

In accordance with some embodiments of the present invention, an optical display includes the polarizing plate as set forth above.

DETAILED DESCRIPTION

Figure 1:
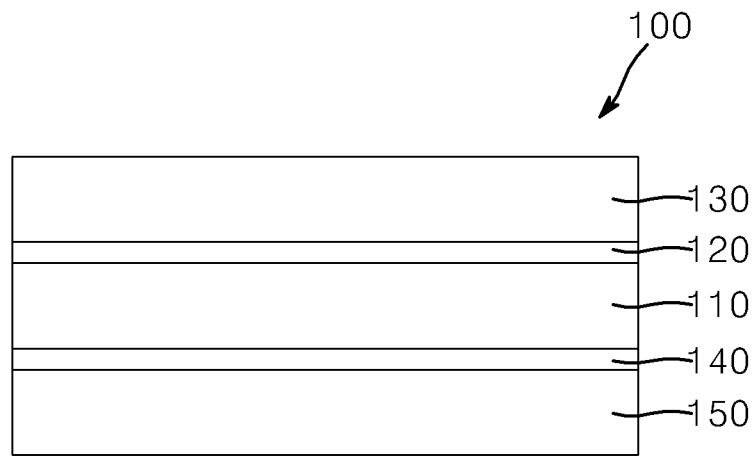
FIG. 1 is a schematic cross-sectional view of a polarizing plate according to embodiments of the present invention.

Embodiments of the present invention are described with reference to the accompanying drawings. It is understood that the described embodiments of the present invention may modified in different ways, and the present invention is not limited to the described embodiments. In the drawings, portions irrelevant to the description are omitted for clarity. Like components are denoted by like reference numerals throughout the specification. As used herein, terms such as "upper" and "lower" are defined with reference to the accompanying drawings. Thus, it is understood that the term "upper side" can be used interchangeably with the term "lower side." Additionally, as used herein, the term "(meth) acrylate" refers to acrylate groups and/or methacrylate groups.

As used herein, the term "peak height" refers to the height from the baseline to the maximum absorbance at a wavenumber corresponding to the maximum absorbance upon conversion of transmittance into absorbance in a graph of IR spectrum measurement results, where the x-axis is the wavenumber ($cm^{-1}$), and the y-axis is transmittance (%).

In accordance with embodiments of the present invention, an adhesive film may be formed using an adhesive composition for a polarizing plate that includes an epoxy compound and a (meth)acrylate compound, and has an FT-IR peak ratio of 0.015 or lower as defined by Equation 1.

Equation 1

$$\text{FT-IR peak ratio} = B/A \qquad (1)$$

In Equation 1, A is the peak height of the peak attributable to the —(C=O)— bond at 1724 $cm^{-1}$ and B is the peak height of the peak attributable to the —CH=CH— bond at 1636 $cm^{-1}$.

Specifically, in the adhesive film for a polarizing plate formed using an adhesive composition including an acrylate compound, the ratio of peak height (FT-IR peak ratio=B/A) refers to the ratio of the peak height, B, of the peak attributable to the —(CH=CH)— bond (at 1630 $cm^{-1}$ to 1640 $cm^{-1}$) of the acrylate compound to the peak height, A, of the peak attributable to the —(C=O)— bond (at 1720 $cm^{-1}$ to 1725 $cm^{-1}$) of the acrylate compound. In addition, in the adhesive film for a polarizing plate formed using an adhesive composition including a methacrylate compound, the ratio of peak height (FT-IR peak ratio=B/A) refers to the ratio of the peak height, B, of the peak attributable to the —(CH=CCH$_3$)— bond (at 1630 $cm^{-1}$ to 1640 $cm^{-1}$) of the methacrylate compound to the peak height, A, of the peak attributable to the —(C=O)— bond (at 1630 $cm^{-1}$ to 1640 $cm^{-1}$) of the methacrylate compound.

The epoxy compound may be cured by a photocationic polymerization initiator, and the (meth)acrylate compound may be cured by a photosensitizer, thereby forming the adhesive film. The (meth)acrylate compound has a lower curing rate than the epoxy compound, and the (meth) acrylate compound and the epoxy compound are competitively cured. For example, if the (meth)acrylate compound is not sufficiently cured (e.g., too little photosensitizer is used), there is a possibility of deterioration in adhesion, durability, and durability after immersion of the adhesive film in water. On the other hand, if an excess of the photosensitizer is used, the amount of the photocationic polymerization initiator is reduced, thereby causing insufficient curing of the epoxy compound, which results in a deterioration in the durability of the adhesive film and poor interface adhesion between the polarizer and the protective film. Based on the ratio of peak height, the (meth)acrylate compound in the adhesive film may be evaluated as to the degree of cure. When the ratio of peak height is greater than about 0.015, the adhesive film can exhibit deteriorated adhesion, durability, and adhesion after immersion in water due to insufficient reaction between the (meth)acrylate compound and the photosensitizer, and remaining unreacted (meth)acrylate compound, which can cause outgassing. In some embodiments, for example, the ratio of peak height may be from about 0.001 to 0.015, for example, 0.001, 0.002, 0.003, 0.004, 0.005, 0.006, 0.007, 0.008, 0.009, 0.010, 0.011, 0.012, 0.013, 0.014, or 0.015. Within any of these ranges, the adhesive film can exhibit good adhesion, durability, and adhesion after immersion in water, while avoiding (or reducing) outgassing.

The adhesive film for a polarizing plate according to embodiments of the invention may be formed by curing an adhesive composition for a polarizing plate according to embodiments of the invention under predetermined conditions. In accordance with embodiments of the present invention, an adhesive composition for a polarizing plate includes an epoxy compound, a (meth)acrylate compound, a photosensitizer, and a photocationic polymerization initiator.

The epoxy compound may include two different epoxy compounds having different glass transition temperatures. Specifically, the epoxy compound may include a mixture of a first epoxy compound having a first glass transition temperature of about 0° C. to about 150° C. and a second epoxy compound having a second glass transition temperature of about 50° C. to about 200° C. In some embodiments, the second glass transition temperature (Tg2) of the second epoxy compound may be higher than the first glass transition temperature (Tg1) of the first epoxy compound. For example, the first and second glass transition temperatures may satisfy the following Equation 2.

Equation 2

$$Tg1+50° C.<Tg2 \qquad 2$$

In Equation 2, Tg1 is the first glass transition temperature of the first epoxy compound, and Tg2 is the second glass transition temperature of the second epoxy compound.

The first epoxy compound may include an epoxy compound containing one aromatic group.

If the first epoxy compound is used alone as the epoxy compound, the adhesive film can exhibit poor adhesion and durability, and can suffer from cracking at an edge thereof. If the second epoxy compound is used alone as the epoxy compound, the adhesive film can exhibit poor adhesion and adhesion after immersion in water, and can suffer from cracking at an edge thereof due to insufficient curing of the (meth)acrylate compound. When a mixture of two different epoxy compounds having different glass transition temperatures is used as the epoxy compound, the (meth)acrylate compound can be sufficiently cured, leading to an adhesive film that exhibits good adhesion, durability, and adhesion after immersion in water. In some embodiments, the epoxy compound includes a mixture of an epoxy compound containing one aromatic group and an alicyclic epoxy compound, thereby further avoiding (or reducing) edge cracking of the adhesive film.

The epoxy compound containing one aromatic group provides desirable effects obtained by curing the epoxy compound, and also allows sufficient curing of the (meth) acrylate compound. The epoxy compound containing one aromatic group is an epoxy compound which is liquid at room temperature, and may have a glass transition temperature of about 0° C. to about 150° C., and an epoxy equivalent weight of about 0 g/eq to about 200 g/eq. Within these ranges, the (meth)acrylate compound can also be sufficiently cured. For example, the epoxy compound containing one aromatic group may be at least one of phenyl glycidyl ether, resorcinol diglycidyl ether, and/or butylphenyl glycidyl ether (including t-butylphenyl glycidyl ether).

The first epoxy compound may be present in the epoxy compound in an amount of about 1 wt % to 30 wt %, for example about 1.2 wt % to about 13 wt %. Within these ranges, the (meth)acrylate compound is sufficiently cured such that the ratio of peak height can be less than or equal to about 0.015.

The second epoxy compound may include at least one of an epoxy compound containing at least two aromatic groups, an alicyclic epoxy compound, a hydrogenated epoxy compound, and/or an aliphatic epoxy compound.

The epoxy compound containing at least two aromatic groups is an epoxy compound which is liquid or solid at room temperature, and, for example, may have a glass transition temperature of about 50° C. to about 200° C., for example, about 50° C. to about 150° C., and an epoxy equivalent weight of about 50 g/eq to about 300 g/eq. Within these ranges, the (meth)acrylate compound can be sufficiently cured. For example, the epoxy compound containing at least two aromatic groups may be at least one of a bisphenol A epoxy compound, a bisphenol F epoxy compound, a phenol novolac epoxy compound, a cresol novolac epoxy compound, and/or a bisphenol A novolac epoxy compound.

The alicyclic epoxy compound is an epoxy compound which is liquid at room temperature, and, for example, may have a glass transition temperature of about 50° C. to about 200° C., for example, about 100° C. to about 200° C., and an epoxy equivalent weight of about 50 g/eq to about 200 g/eq. Within these ranges, the (meth)acrylate compound can be sufficiently cured. Nonlimiting examples of suitable alicyclic epoxy compounds may include 3,4-epoxycyclohexylmethyl-3',4'-epoxycyclohexanecarboxylate, 2-(3,4-epoxycyclohexyl-5,5-spiro-3,4-epoxy)cyclohexane-meta-dioxane, bis(3,4-epoxycyclohexylmethyl)adipate, bis(3,4-epoxy-6-methylcyclohexyl)adipate, 3,4-epoxy-6-methylcyclohexyl-3',4'-epoxy-6'-methylcyclohexanecarboxylate, ε-caprolactone-modified 3,4-epoxycyclohexylmethyl-3',4'-epoxycyclohexanecarboxylate, trimethylcaprolactone-modified 3,4-epoxycyclohexylmethyl-3',4'-epoxycyclohexanecarboxylate, β-methyl-δ-valerolactone-modified 3,4-epoxycyclohexylmethyl-3',4'-epoxycyclohexanecarboxylate, methylenebis(3,4-epoxycyclohexane), di(3,4-epoxycyclohexylmethyl)ether of ethylene glycol, ethylenebis(3,4-epoxycyclohexanecarboxylate), dioctyl epoxycyclohexahydrophthalate, di-2-ethylhexyl epoxycyclohexahydrophthalate, and/or the like.

The hydrogenated epoxy compound may be an epoxy compound which is liquid at room temperature, and, for example, may have a glass transition temperature of about 50° C. to about 200° C., for example, about 50° C. to about 150° C., and an epoxy equivalent weight of about 0 g/eq to about 200 g/eq. Within these ranges, the (meth)acrylate compound can be sufficiently cured. For example, the hydrogenated epoxy compound may be a compound obtained by hydrogenation of bisphenol type epoxy resins such as diglycidyl ether of bisphenol A, diglycidyl ether of bisphenol F, diglycidyl ether of bisphenol S, and the like; novolac type epoxy resins, such as phenol novolac epoxy resins, cresol novolac epoxy resins, and hydroxybenzaldehyde phenol novolac epoxy resins; polyfunctional epoxy resins, such as glycidyl ether of tetrahydroxyphenylmethane, glycidyl ether of tetrahydroxybenzophenone, epoxidized polyvinyl phenol, and/or the like.

The aliphatic epoxy compound may have a glass transition temperature of about 50° C. to about 200° C., for example, about 50° C. to about 150° C., and an epoxy equivalent weight of about 0 g/eq to about 200 g/eq. Nonlimiting examples of the aliphatic epoxy compound may include 1,4-butanediol diglycidyl ether, 1,6-hexanediol diglycidyl ether, neopentyl glycol diglycidyl ether, trimethylolpropane triglycidyl ether, polyethylene glycol diglycidyl ether, glycerin triglycidyl ether, polypropylene glycol diglycidyl ethers; polyglycidyl ethers of polyether polyols obtained by adding at least one alkylene oxide to aliphatic polyhydric alcohols, such as ethylene glycol, propylene glycol, glycerin, and the like; diglycidyl esters of aliphatic long-chain dibasic acid; monoglycidyl ethers of aliphatic higher alcohols; glycidyl ethers of higher fatty acid; epoxidized soybean oil; butyl epoxystearate; octyl epoxystearate; epoxidized linseed oil; epoxidized polybutadiene, and/or the like.

The second epoxy compound may be present in the epoxy compound in an amount of about 70 wt % to about 99 wt %, for example about 87 wt % to 98.8 wt % in the epoxy compound. Within these ranges, the (meth)acrylate compound can be sufficiently cured.

In the adhesive composition for a polarizing plate, a ratio of the epoxy compound to the (meth)acrylate compound may be greater than about 1, for example from about 3 to about 4. Within these ranges, the ratio of peak height can be less than or equal to about 0.015, and the cured adhesive composition can have an increased glass transition temperature, leading to an adhesive film exhibiting good adhesion, durability, and adhesion after immersion in water.

Although the (meth)acrylate compound can contain no hydroxyl groups, in some embodiments, the (meth)acrylate compound has at least one hydroxyl group to enhance interface adhesion between the polarizer and an optical film and bonding to the cation activated epoxy compound. The (meth)acrylate compound may be a monofunctional (meth) acrylate, a polyfunctional (meth)acrylate, or a mixture thereof, and the (meth)acrylate compound is characterized as monofunctional or polyfunctional based on the number of (meth)acrylate groups. The polyfunctional (meth)acrylate may contain at least two, for example, from 2 to 6 (meth) acrylate groups.

The hydroxyl group-containing monofunctional (meth) acrylate may be a $C_1$ to $C_{10}$, for example, a $C_1$ to $C_5$, alkyl group-containing (meth)acrylate having at least one hydroxyl group. For example, the hydroxyl group-containing monofunctional (meth)acrylate may include 2-hydroxyethyl(meth)acrylate, 4-hydroxybutyl(meth)acrylate, 2-hydroxypropyl(meth)acrylate, 2-hydroxybutyl(meth)acrylate, 6-hydroxyhexyl(meth)acrylate, 2-hydroxy-3-phenoxypropyl(meth)acrylate, or a mixture thereof. The hydroxyl group-containing monofunctional (meth)acrylate may be present in the adhesive composition in an amount of about 10 wt % to 25 wt %. Within this range, the adhesive film can exhibit enhanced adhesion.

The monofunctional (meth)acrylate not containing a hydroxyl group may contain an aromatic group and a (meth)acrylate group despite containing no hydroxyl group, thereby increasing the cure rate of the adhesive composition while reducing the index of refraction of the adhesive film. For example, the monofunctional (meth)acrylate not containing a hydroxyl group may be a (meth)acrylate containing a $C_1$ to $C_{10}$, for example, a $C_1$ to $C_5$, alkyl group substituted with a $C_6$ to $C_{10}$ aryloxy group. For example, the monofunctional (meth)acrylate not containing a hydroxyl group may be phenoxyethyl(meth)acrylate. The monofunctional (meth)acrylate not containing a hydroxyl group may be present in an amount of about 0 wt % to about 20 wt %, for example, about 0.1 wt % to about 15 wt %.

The epoxy compound may be present in an amount of about 45 parts by weight to about 90 parts by weight, and the (meth)acrylate compound may be present in an amount of about 10 parts by weight to about 55 parts by weight based on a total of 100 parts by weight of the epoxy compound and the (meth)acrylate compound. Within these ranges, the (meth)acrylate compound can be sufficiently cured and the cured adhesive composition can have an increased glass transition temperature, leading to an adhesive film exhibiting good adhesion, durability, and adhesion after immersion in water. In some embodiments, for example, the epoxy compound may be present in an amount of about 50 parts by weight to about 85 parts by weight, and the (meth)acrylate compound may be present in an amount of about 15 parts by weight to about 50 parts by weight based on a total of 100 parts by weight of the epoxy compound and the (meth)acrylate compound.

The photosensitizer generates a small amount of radicals to promote curing. The adhesive composition for a polarizing plate according to some embodiments has a hybrid cured structure by including both the epoxy compound and the (meth)acrylate compound. The photosensitizer causes curing of the (meth)acrylate, while promoting initiation by the photocationic polymerization initiator necessary to cure the epoxy compound, thereby enhancing the reactivity of the photocationic polymerization initiator.

The photosensitizer may include phosphorus photosensitizers, triazine photosensitizers, acetophenone photosensitizers, benzophenone photosensitizers, thioxanthone photosensitizers, benzoin photosensitizers, oxime photosensitizers, and/or mixtures thereof. In some embodiments, the photosensitizer may include a thioxanthone photosensitizer, thereby further enhancing reactivity.

The photosensitizer may be present in an amount of about 0.1 parts by weight to about 10 parts by weight, preferably about 0.5 parts by weight to about 3 parts by weight based on the total parts by weight of the epoxy compound and the (meth)acrylate compound. Within these ranges, the (meth)acrylate compound can be sufficiently cured under light intensity process conditions, and the reactivity of the photocationic polymerization initiator can be improved.

The photocationic polymerization initiator may include any suitable photocationic polymerization initiator capable of performing a photocuring reaction. The photocationic polymerization initiator may include an onium ion as a cation and an onium salt as an anion. Nonlimiting examples of the onium ion may include: diaryliodonium such as diphenyliodonium, 4-methoxydiphenyliodonium, bis(4-methylphenyl)iodonium, bis(4-tert-butylphenyl)iodonium, bis(dodecylphenyl)iodonium, and/or the like; triarylsulfonium such as triphenylsulfonium, diphenyl-4-thiophenoxyphenylsulfonium, and/or the like; bis[4-(diphenylsulfonio)-phenyl]sulfide; bis[4-(di(4-(2-hydroxyethyl)phenyl)sulfonio)-phenyl]sulfide; 5-2,4-(cyclopentadienyl)[1,2,3,4, 5,6-η]-[methylethyl)-benzene-]-iron (1+), and/or the like. Nonlimiting examples of the anion may include tetrafluoroborate ($BF_4^-$), hexafluorophosphate ($PF_6^-$), hexafluoroantimonate ($SbF_6^-$), hexafluoroarsenate ($AsF_6^-$), hexachloroantimonate ($SbCl_6^-$), and/or the like.

The photocationic polymerization initiator may be present in an amount of about 0.1 parts by weight to 10 parts by weight, for example about 0.1 parts by weight to 3 parts by weight based on a total of 100 parts by weight of the epoxy compound and the (meth)acrylate compound. Within these ranges, the epoxy compound can be sufficiently polymerized and residual initiator can be prevented or reduced.

The photosensitizer and the photocationic polymerization initiator, in total (i.e., the sum total amount of the photosensitizer and the photocationic polymerization initiator), may be present in an amount of about 1 part by weight to 10 parts by weight, for example about 3 parts by weight to 6 parts by weight based on a total of 100 parts by weight of the epoxy compound and the (meth)acrylate compound. Within these range, it is possible to avoid (or reduce the amount of) insufficient curing of the adhesive composition, and to prevent (or reduce) burning of the polarizer during photocuring and deterioration in adhesion and durability of the adhesive film.

In some embodiments, the adhesive composition for a polarizing plate may include about 40 wt % to about 90 wt % of the epoxy compound, about 9 wt % to about 59 wt % of the (meth)acrylate compound, and about 1 wt % to about 10 wt % of the sum of the photosensitizer plus the photocationic polymerization initiator in terms of solids content. Within these ranges, the adhesive film can exhibit good adhesion, durability, and adhesion after immersion in water.

The adhesive composition for a polarizing plate may be prepared by mixing the epoxy compound and the (meth)acrylate compound, followed by introducing and mixing the photosensitizer subsequent to introduction of the photocationic polymerization initiator. The adhesive composition for a polarizing plate may have a viscosity of about 30 mPa to about 120 mPa as measured at 25° C. Within this range, the adhesive composition can exhibit good coatability and application properties (with respect to its use in optical films).

The adhesive composition for a polarizing plate may further include additives, for example, antioxidants, UV absorbers, ionic conductive agents, conductivity imparting agents such as conductive metal oxide particles, light diffusivity imparting agents, viscosity modifiers, and/or the like, so long as the additives do not deteriorate the properties of the adhesive film.

The adhesive film for a polarizing plate according to embodiments of the invention may be prepared by curing the adhesive composition for a polarizing plate through irradiation at a dose of about 10 mJ/cm$^2$ to about 10,000 mJ/cm$^2$ at a wavelength of about 200 nm to about 450 nm and an irradiance of about 1 mW/cm$^2$ to about 500 mW/cm$^2$.

The adhesive film for a polarizing plate may have a thickness of about 0.1 μm to about 10 μm, and a haze value of about 0% to about 20%, for example about 0.2% to about 4.5% as measured at a wavelength of about 400 nm to about 700 nm. Within these ranges, the adhesive film is transparent when attached to optical films, thereby securing sufficient optical transmittance.

The adhesive film for a polarizing plate may have a thickness of about 3 μm or lower, for example about 1 μm to about 3 μm. Within these ranges, the adhesive film is suitable for use as an adhesive film for polarizing plates.

The adhesive film for a polarizing plate may have a glass transition temperature of about 55° C. to about 105° C., for example about 75° C. to about 105° C. Within these ranges, the adhesive film can exhibit good adhesion, durability, and adhesion after immersion in water.

In accordance with embodiments of the present invention, a polarizing plate may include the adhesive film formed of the adhesive composition for a polarizing plate according to embodiments of the present invention. Hereinafter, a polarizing plate according to embodiments of the invention will be described with reference to FIGS. 1 and 2. FIG. 1 is a schematic cross-sectional view of the polarizing plate according to embodiments of the invention.

Referring to FIG. 1, the polarizing plate 100 according to embodiments of the invention may include: a polarizer 110; a first adhesive film for a polarizing plate 120 formed on an upper surface of the polarizer 110; a first optical film 130 formed on an upper surface of the first adhesive film for a polarizing plate 120; a second adhesive film for a polarizing plate 140 formed on a lower surface of the polarizer 110; and a second optical film 150 formed on a lower surface of the second adhesive film for a polarizing plate 140. At least one of the first adhesive film 120 and the second adhesive film 140 may be formed of the adhesive composition according to embodiments of the invention.

The polarizer may be prepared by dyeing a film formed of a polyvinyl alcohol resin with iodine, followed by stretching. The polyvinyl alcohol resin may include saponified products of polyvinyl alcohol, polyvinyl formal, polyvinyl acetal, ethylene vinyl acetate copolymer, and/or the like. The polyvinyl alcohol resin film may have a degree of saponification of about 99 mol % or greater, for example from about 99 mol % to about 99.5 mol %, a degree of polymerization of about 2000 or greater, for example from about 2000 to about 2500, and a thickness of about 5 μm to about 200 μm. The polarizer may have a thickness of about 5 μm to about 200 μm. Within this range, the polarizer is suitable for use in a polarizing plate.

The first optical film 130 and the second optical film 150 may each independently be at least one of a protective film and/or a retardation film, and the optical films 130 and 150 are not particularly restricted so long as the films are transparent.

By way of example, the protective film may be a zero retardation film, and may be formed of a material selected from cellulose resins including triacetyl cellulose (TAC), polyester resins including polyethylene terephthalate (PET), cycloolefin polymers (COP), polycarbonate (PC) resins, polyacrylate resins, polyethersulfone resins, polysulfone resins, polyamide resins, polyimide resins, polyolefin resins, polyarylate resins, polyvinyl alcohol resins, polyvinyl chloride resins, polyvinylidene chloride resins, and/or mixtures thereof.

The retardation film may include any film without limitation so long as the film has a λ/2 or λ/4 phase retardation function. For example, the retardation film may be a film formed of an olefin, such as a cycloolefin polymer (COP), an acrylic resin, a cellulose resin, and/or a mixture thereof.

The first optical film and the second optical film may be subjected to surface treatment, for example, corona pretreatment at about 250 mJ/cm² or greater, before coating the adhesive composition or before preparation of the polarizing plate.

Each of the first and second optical films 130 and 150 may independently have a thickness of about 25 μm to about 500 μm. Within this range, the optical films can be applied to a polarizing plate when stacked on a polarizing device. In some embodiments, each of the first optical film 130 and the second optical film 150 has a thickness from about 25 μm to about 100 μm.

The polarizing plate may be prepared by any suitable method. For example, the adhesive composition for a polarizing plate may be coated onto one surface of the protective film, thereby preparing the protective film having an adhesive composition layer. The adhesive composition layer may be dried, as needed. The adhesive composition may be coated by die coating, roll coating, gravure coating, or spin coating. The protective film having the adhesive composition layer is stacked on each of the upper and lower surfaces of the polarizer, thereby providing a stack structure. Then, the adhesive composition layer is cured using UV irradiation to form an adhesive layer, thereby preparing a polarizing plate. UV irradiation is performed at a dose of about 10 mJ/cm² to about 1,000 mJ/cm² at a wavelength of about 200 nm to about 450 nm and an irradiance of 1 mW/cm² to 500 mW/cm².

Figure 2:
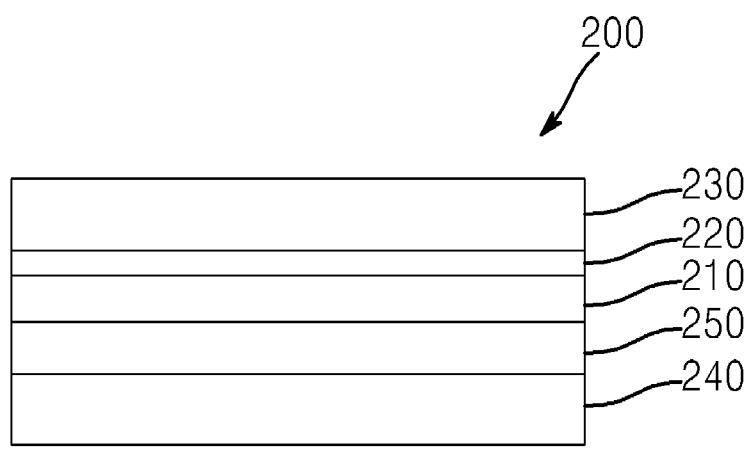
FIG. 2 is a schematic cross-sectional view of a polarizing plate according to embodiments of the present invention.

FIG. 2 is a schematic cross-sectional view of a polarizing plate according to embodiments of the present invention. Referring to FIG. 2, the polarizing plate 200 may include: a polarizer 210; a transparent first protective layer 250 stacked on one surface of the polarizer 210; and a transparent second protective layer 230 stacked on the other surface of the polarizer 210. The first protective layer 250 may be formed of a cured product of a curable composition containing an activation energy-curable compound. The second protective layer 230 may include a thermoplastic resin film, for example, an acetylcellulose film. The second protective layer 230 may be bonded to the polarizer 210 by a first adhesive layer 220. In addition, a second adhesive layer 240 for connection to liquid crystal cells may be formed on a surface of the first protective layer 250 opposite the surface of the first protective layer 250 that faces the polarizer 210. At least one of the adhesive layers 220 and 240 may be formed of the adhesive composition for a polarizing plate according to embodiments of the present invention.

In accordance with embodiments of the present invention, an optical display may include the adhesive composition for a polarizing plate, an adhesive film formed of the adhesive composition, or a polarizing plate including the same. The optical display may be any suitable optical display including a polarizing plate, and may include, for example, a liquid crystal display.

Figure 3:
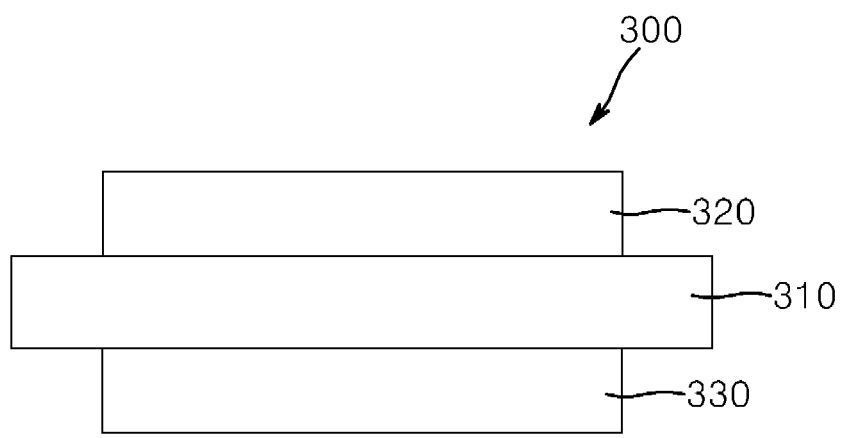
FIG. 3 is a schematic cross-sectional view of an optical display according to embodiments of the present invention.

FIG. 3 is a schematic cross-sectional view of an optical display according to embodiments of the present invention. Referring to FIG. 3, the optical display 300 according to embodiments of the invention may include: a liquid crystal panel 310; a first polarizing plate 320 formed on an upper surface of the liquid crystal panel 310; and a second polarizing plate 330 formed on a lower surface of the liquid crystal panel 310. At least one of the first polarizing plate 320 and the second polarizing plate 330 may be a polarizing plate according to embodiments of the invention.

Hereinafter, the present invention will be described with reference to some examples. It should be understood that these examples are provided for illustration only and are not to be construed in any way as limiting the embodiments of the present invention.

EXAMPLE

The components used in the Preparative Examples are as follows:

A) Epoxy compound
A1) First epoxy compound
Phenyl Glycidyl Ether (DENACOL EX-141, NAGASE, Tg: 10° C.)
Resorcinol Diglycidyl Ether (DENACOL EX-201, NAGASE, Tg: 124° C.)

A2) Second epoxy compound
Bisphenol-A Epoxy (KDS-8128, Kukdo Chemical Co., Ltd., Tg: 80° C.)
Hydrogenated Epoxy (YX-8000, JER Co., Ltd., Tg: 103° C.)
⑤ Aliphatic Cycloepoxy (SEE-4221, Seechem Co., Ltd., Tg: 200° C.)

B) Acrylate compound
⑥ 2-Hydroxyethyl Acrylate (100%, SK CYTEC Co., Ltd.)
⑦ 4-Hydroxybutyl Acrylate (100%, Osaka Organic Co., Ltd., JAPAN)
⑧ Phenoxyethyl Acrylate (M140, Miwon Co., Ltd.)
⑨ 2-Hydroxy 3-Phenoxypropyl Acrylate (M600A, Kyoeisha)

C) Photosensitizer
⑩ Thioxanthone (DETX-S, Nippon Kayaku Co., Ltd.)

D) Photocationic polymerization initiator
⑪ Iodonium salt, hexafluorophosphate (Irgacure-250, Basf)

Preparative Examples 1 to 16

Preparation of Adhesive Composition for a Polarizing Plate

Without solvent, an epoxy compound and an acrylate compound were mixed in the amounts listed in Table 1 (unit: parts by weight). A photosensitizer and a photocationic polymerization initiator were mixed with the resulting mixture in the amounts listed in Table 1, thereby preparing adhesive compositions for a polarizing plate.

TABLE 1

| | Epoxy compound | | | | | Acrylate compound | | | | Photosensitizer | Photocationic polymerization initiator |
|---|---|---|---|---|---|---|---|---|---|---|---|
| | ① | ② | ③ | ④ | ⑤ | ⑥ | ⑦ | ⑧ | ⑨ | ⑩ | ⑪ |
| Preparative Example 1 | — | — | 79 | — | — | 20 | — | — | — | 2 | 1 |
| Preparative Example 2 | 5 | — | 75 | — | — | 20 | — | — | — | 4 | 0.5 |
| Preparative Example 3 | 10 | — | 70 | — | — | 20 | — | — | — | 3 | 1 |
| Preparative Example 4 | 5 | — | — | 75 | — | 20 | — | — | — | 4 | 0.5 |
| Preparative Example 5 | 5 | — | — | — | 75 | 20 | — | — | — | 4 | 1 |
| Preparative Example 6 | 5 | — | — | — | 75 | — | 20 | — | — | 4 | 0.5 |
| Preparative Example 7 | 5 | — | — | — | 75 | — | 10 | 10 | — | 2 | 1.5 |
| Preparative Example 8 | 5 | — | — | — | 75 | — | 10 | — | 10 | 3 | 1.5 |
| Preparative Example 9 | — | 5 | — | — | 75 | — | 10 | 10 | — | 4 | 1.5 |
| Preparative Example 10 | — | 5 | — | — | 75 | — | 10 | — | 10 | 3 | 1 |
| Preparative Example 11 | — | 5 | — | — | 75 | — | 10 | — | 10 | 4 | 1 |
| Preparative Example 12 | — | 5 | — | — | 75 | — | 10 | — | 10 | 5 | 1 |
| Preparative Example 13 | — | — | 40 | — | — | 60 | — | — | — | 1 | — |
| Preparative Example 14 | — | — | 50 | — | — | 50 | — | — | — | — | 0.5 |
| Preparative Example 15 | 60 | — | — | — | — | 40 | — | — | — | 0.5 | 0.5 |
| Preparative Example 16 | — | 40 | 60 | — | — | — | — | — | — | 10 | 1 |

Examples 1 to 12 and Comparative Examples 1 to 4

Preparation of Polarizing Plate

Example 1

An 80 μm thick polyvinyl alcohol film (degree of saponification: 99.5 mol %; degree of polymerization: 2000) was dyed in a 0.3% aqueous iodine solution, followed by stretching at a stretching ratio of 5.0. Next, the stretched polyvinyl alcohol base film was subjected to color compensation in a 3% boric acid solution and in a 2% aqueous solution of potassium iodide, followed by drying at 50° C. for 4 minutes, thereby preparing a polarizer (thickness: 25 μm).
An 80 μm thick triacetyl cellulose (TAC) film was used as an upper protective film. The TAC film was subjected to corona treatment at 250 mJ/cm² or greater.

A 30 μm thick cycloolefin resin (which refers to resins polymerized using a cyclic olefin as a polymerization unit) (COP) was used as a lower protective film. This resin was subjected to corona treatment at 250 W·min/m² or greater.

The upper protective film, the adhesive composition of Preparative Example 1, the polarizer, the adhesive composition of Preparative Example 1, and the lower protective film were sequentially stacked under conditions of a temperature of 22° C. to 25° C. and a relative humidity of 20% to 60%, followed by UV irradiation at 400 mW/cm² and 1000 mJ/cm² using a metal halide lamp, thereby preparing a polarizing plate (thickness: 140 μm).

Example 2

A polarizing plate was prepared as in Example 1, except that the adhesive composition of Preparative Example 2 was used.

Example 3

A polarizing plate was prepared as in Example 1, except that the adhesive composition of Preparative Example 3 was used, and a 100 μm thick polyethylene terephthalate (PET) film subjected to corona treatment at 250 mJ/cm² or greater was used as the upper protective film.

Example 4

A polarizing plate was prepared as in Example 1, except that the adhesive composition of Preparative Example 4 was used, and a 40 μm thick acrylic film subjected to corona treatment at 250 mJ/cm² or greater was used as the upper protective film.

Example 5

A polarizing plate was prepared as in Example 1, except that the adhesive composition of Preparative Example 5 was used.

Example 6

A polarizing plate was prepared as in Example 1, except that the adhesive composition of Preparative Example 6 was used, and a 100 μm thick polyethylene terephthalate (PET) film subjected to corona treatment at 250 mJ/cm² or greater was used as the upper protective film.

Example 7

A polarizing plate was prepared as in Example 1, except that the adhesive composition of Preparative Example 7 was used, and a 40 μm thick acrylic film subjected to corona treatment at 250 mJ/cm² or greater was used as the upper protective film.

Example 8

A polarizing plate was prepared as in Example 1, except that the adhesive composition of Preparative Example 8 was used.

Example 9

A polarizing plate was prepared as in Example 1, except that the adhesive composition of Preparative Example 9 was used, and a 40 μm thick acrylic film subjected to corona treatment at 250 mJ/cm² or greater was used as the upper protective film.

Example 10

A polarizing plate was prepared as in Example 1, except that the adhesive composition of Preparative Example 10 was used.

Example 11

A polarizing plate was prepared as in Example 1, except that the adhesive composition of Preparative Example 11 was used, and a 100 μm thick polyethylene terephthalate (PET) film subjected to corona treatment at 250 mJ/cm² or greater was used as the upper protective film.

Example 12

A polarizing plate was prepared as in Example 1, except that the adhesive composition of Preparative Example 12 was used, and a 100 μm thick polyethylene terephthalate (PET) film subjected to corona treatment at 250 mJ/cm² or greater was used as the upper protective film.

Comparative Example 1

A polarizing plate was prepared as in Example 1, except that the adhesive composition of Preparative Example 13 was used, and a 100 μm thick polyethylene terephthalate (PET) film subjected to corona treatment at 250 mJ/cm² or greater was used as the upper protective film.

Comparative Example 2

A polarizing plate was prepared as in Example 1, except that the adhesive composition of Preparative Example 14 was used.

Comparative Example 3

A polarizing plate was prepared as in Example 1, except that the adhesive composition of Preparative Example 15 was used, and a 40 μm thick acrylic film subjected to corona treatment at 250 mJ/cm² or greater was used as the upper protective film.

Comparative Example 4

A polarizing plate was prepared as in Example 1, except that the adhesive composition of Preparative Example 16 was used, and a 100 μm thick polyethylene terephthalate (PET) film subjected to corona treatment at 250 mJ/cm² or greater was used as the upper protective film.

Each of the adhesive compositions for a polarizing plate of the Examples and Comparative Examples were evaluated for adhesion, adhesion after immersion in water for 24 hours, FT-IR peak ratio, and FT-IR peak of the C=O bond. The results are shown in Table 2.

TABLE 2

| | Upper protective film | Lower protective film | Tg of adhesive film (° C.) | Adhesion | | Adhesion after immersion in water for 24 hrs | | FT-IR peak ratio (C=O to C=C) | FT-IR peak (C=O) |
|---|---|---|---|---|---|---|---|---|---|
| | | | | Upper surface | Lower surface | Upper surface | Lower surface | | |
| Example 1 | TAC | COP | 76 | ○ | ○ | ○ | ○ | 0.013 | 0.217 |
| Example 2 | TAC | COP | 78 | ○ | ○ | ⊚ | ○ | 0.011 | 0.209 |
| Example 3 | PET | COP | 82 | ⊚ | ○ | ⊚ | ○ | 0.009 | 0.211 |
| Example 4 | ACRYL | COP | 98 | ○ | ⊚ | ⊚ | ⊚ | 0.005 | 0.205 |
| Example 5 | TAC | COP | 84 | ○ | ⊚ | ⊚ | ⊚ | 0.005 | 0.207 |
| Example 6 | PET | COP | 86 | ○ | ○ | ○ | ⊚ | 0.008 | 0.209 |
| Example 7 | ACRYL | COP | 88 | ○ | ○ | ⊚ | ⊚ | 0.007 | 0.209 |
| Example 8 | TAC | COP | 90 | ⊚ | ○ | ⊚ | ⊚ | 0.006 | 0.203 |
| Example 9 | ACRYL | COP | 95 | ⊚ | ○ | ⊚ | ⊚ | 0.005 | 0.202 |
| Example 10 | TAC | COP | 94 | ○ | ⊚ | ○ | ⊚ | 0.006 | 0.203 |
| Example 11 | PET | COP | 100 | ⊚ | ⊚ | ⊚ | ⊚ | 0.002 | 0.199 |
| Example 12 | PET | COP | 92 | ○ | ⊚ | ⊚ | ⊚ | 0.004 | 0.204 |
| Comp. Example 1 | PET | COP | 5 | X | X | X | X | 0.215 | 0.335 |
| Comp. Example 2 | TAC | COP | 7 | Δ | Δ | X | X | 0.097 | 0.287 |
| Comp. Example 3 | ACRYL | COP | 65 | Δ | Δ | Δ | X | 0.035 | 0.256 |
| Comp. Example 4 | PET | COP | 123 | Δ | Δ | Δ | X | 0 | 0 |

As shown in Table 2, the adhesive films for a polarizing plate according to embodiments of the present invention exhibited an FT-IR peak ratio of 0.015 or lower, and thus had a high glass transition temperature (Tg). Accordingly, the adhesive films according to embodiments of the present invention also exhibited good adhesion and adhesion after immersion in water, thereby exhibiting good durability.

On the contrary, the adhesive films of Comparative Examples 1 to 2 (not including the first epoxy compound) and Comparative Example 3 (not including the second epoxy compound) had an FT-IR peak ratio of higher than 0.015 and exhibited poor adhesion, adhesion after immersion in water, and durability. In addition, the adhesive film of Comparative Example 4 (not including the acrylate compound) also exhibited poor adhesion, adhesion after immersion in water, and durability.

In determining the values and observations reported in Table 2, the following procedures were followed:

1) Adhesion: For each of the polarizing plates, adhesion between the polarizer and the protective film was checked. To this end, a cutter was inserted between the protective film and the polarizer at one end of the polarizing plate. A polarizing plate which did not allow insertion of the cutter between the protective film and the polarizer was rated as ⊚, and a polarizing plate which did not suffer from separation of the protective film even though it allowed slight insertion of the cutter was rated as ○. A polarizing plate which allowed insertion of the cutter and suffered from separation of a portion of the protective film that did not allow insertion of the cutter upon tearing off the part of the protective film that was separated due to insertion of the cutter was rated as Δ. A polarizing plate which allowed easy insertion of the cutter or suffered from easy separation of the protective film was rated as X.

2) Adhesion after immersion in water: Each of the polarizing plates was dipped in constant temperature water (25° C.) for 24 hours, followed by evaluation of adhesion in accordance with the criteria for determining adhesion discussed above.

3) FT-IR peak ratio: 0.01 g of each of the adhesive films for a polarizing plate was cured through UV irradiation at 1000 mJ/cm² and 400 mW/cm² at a wavelength of about 300 nm to about 400 nm using a metal halide lamp, followed by measurement of the ratio of peak height in an FT-IR (Nicolet Nexus 670 spectrometer with Smart Golden Gate installed) ATR mode. The height of the peak attributable to the acrylate —C(=O)— bond was defined as height A from the baseline to the apex of the peak at 1724 cm$^{-1}$, in which the baseline is a straight line passing from 1720 cm$^{-1}$ to 1725 cm$^{-1}$. In addition, the height of the peak attributable to the acrylate —CH=CH— bond was defined as height B from the baseline to the apex of the peak at 1636 cm$^{-1}$, in which the baseline is a straight line passing from 1630 cm$^{-1}$ to 1640 cm$^{-1}$. In addition, the ratio of the peak heights was calculated as B/A.

4) Tg of adhesive film: For each of the adhesive films for a polarizing plate, the glass transition temperature (Tg) was measured using a Discovery DSC (TA Instrument) under the following measurement conditions: heating condition of a 1st run and a 2nd run, where, in the 1st run, the adhesive film was heated to 200° C. at a heating rate of 20° C./min and then cooled to 0° C., and in the 2nd run, the adhesive film was heated to 200° C. at a heating rate of 10° C./min; under a nitrogen atmosphere.

While certain exemplary embodiments of the present invention have been illustrated and described, it is understood that various modifications, changes and alterations can be made to the described embodiments without departing from the spirit and scope of the present invention, as defined in the following claims.

What is claimed is:

1. An adhesive film for a polarizing plate, the adhesive film being formed from an adhesive composition for a polarizing plate comprising an epoxy component and a (meth)acrylate component, the epoxy component comprising a first epoxy compound having a first glass transition temperature and a second epoxy compound having a second glass transition temperature, the second glass transition temperature being different from the first glass transition temperature by 50° C. or more, wherein the adhesive film has an FT-IR peak ratio of about 0.015 or lower as defined by Equation 1:

Equation 1

$$\text{FT-IR peak ratio} = B/A \qquad (1),$$

wherein A is a peak height attributable to a —(C=O)— bond at 1724 cm$^{-1}$ and B is a peak height attributable to a —CH=CH— bond at 1636 cm$^{-1}$.

2. The adhesive film according to claim 1, wherein the adhesive film has a glass transition temperature of about 55° C. to about 105° C.

3. The adhesive film according to claim 1, wherein a weight ratio of the epoxy component to the (meth)acrylate component in the adhesive composition is greater than about 1.

4. The adhesive film according to claim 1, wherein the first glass transition temperature is about 0° C. to about 150° C. and the second glass transition temperature is about 50° C. to about 200° C.

5. The adhesive film according to claim 1, wherein the first epoxy compound comprises an epoxy compound containing one aromatic group; and the second epoxy compound comprises at least one of an epoxy compound containing at least two aromatic groups, an alicyclic epoxy compound, a hydrogenated epoxy compound, or an aliphatic epoxy compound.

6. The adhesive film according to claim 5, wherein the first epoxy compound comprises at least one of phenyl glycidyl ether, resorcinol diglycidyl ether, or butylphenyl glycidyl ether.

7. The adhesive film according to claim 1, wherein the adhesive composition further comprises a photosensitizer and a photocationic polymerization initiator.

8. The adhesive film according to claim 7, wherein the adhesive composition comprises:
    about 0.1 parts by weight to about 10 parts by weight of the photosensitizer based on a total of 100 parts by weight of a sum of about 40 wt % to about 90 wt % of the epoxy component and about 10 wt % to about 60 wt % of the (meth)acrylate component in terms of solids content; and
    about 0.1 parts by weight to about 10 parts by weight of the photocationic polymerization initiator based on a total of 100 parts by weight of a sum of about 40 wt % to about 90 wt % of the epoxy component and about 10 wt % to about 60 wt % of the (meth)acrylate component in terms of solids content.

9. The adhesive film according to claim 1, wherein the first epoxy compound is present in the epoxy component in an amount of about 1 wt % to about 30 wt %, and the second epoxy compound is present in the epoxy component in an amount of about 70 wt % to about 99 wt %.

10. The adhesive film according to claim 1, wherein the (meth)acrylate component comprises a hydroxyl group-containing monofunctional acrylate.

11. The adhesive film according to claim 10, wherein the (meth)acrylate component further comprises a $C_1$ to $C_{10}$ alkyl group-containing (meth)acrylate substituted with a $C_6$ to $C_{10}$ aryloxy group.

12. A polarizing plate, comprising the adhesive film for a polarizing plate according to claim 1.

13. An optical display, comprising the polarizing plate according to claim 12.

* * * * *